United States Patent [19]

Konrad et al.

[11] Patent Number: 4,958,859
[45] Date of Patent: Sep. 25, 1990

[54] PRE-ASSEMBLY MUFF FOR THE CUTTING OR CLAMPING RING OF A PIPE COUPLING

[75] Inventors: Mathias Konrad; Wolfgang Weber, both of Lohmar, Fed. Rep. of Germany

[73] Assignee: Jean Walterscheid GmbH, Lohmar, Fed. Rep. of Germany

[21] Appl. No.: 345,782

[22] Filed: May 1, 1989

[30] Foreign Application Priority Data

Jun. 9, 1988 [DE] Fed. Rep. of Germany ....... 3819635

[51] Int. Cl.$^5$ ............................................. F16L 35/00
[52] U.S. Cl. .................................... 285/39; 285/93; 285/382.7
[58] Field of Search .................... 285/93, 39, 382.7

[56] References Cited

U.S. PATENT DOCUMENTS

| | | | |
|---|---|---|---|
| 2,139,413 | 12/1938 | Kreidel | 285/382.7 X |
| 2,230,116 | 1/1941 | Kreidel | 285/382.7 X |
| 2,414,995 | 1/1947 | Wurzburger | 285/382.7 X |
| 3,643,984 | 2/1972 | Bulleri | 285/382.7 X |
| 4,630,851 | 12/1986 | Ogawa | 285/382.7 X |

*Primary Examiner*—Dave W. Arola
*Attorney, Agent, or Firm*—Toren, McGeady & Associates

[57] ABSTRACT

A pre-assembly muff (12; 12a) for fitting a cutting or clamping ring (3) of a pipe coupling. Conventional muffs have a problem in that in service their dimensions change so that an accurate ring assembly ensuring accurate functioning is no longer possible. Only by checking the dimensions of the inner cone (13) of the pre-assembly muff is it possible to determine whether the end of the service life has been reached. The muff according to the invention has a wear resistant coating applied to its inner cone (13). The coating has a color which differs from that of the base material. If due to frequent use the colored coating is removed, the base material shines through. This is a sign for the user indicating that the end of the service life of the pre-assembly muff has been reached.

2 Claims, 1 Drawing Sheet

PRE-ASSEMBLY MUFF FOR THE CUTTING OR CLAMPING RING OF A PIPE COUPLING

BACKGROUND TO THE INVENTION

Field of the Invention

This invention relates to a pre-assembly muff for fitting a cutting or clamping ring of a pipe coupling, which comprises an inner cone which is designed to support the ring slid on to the pipe and into which the ring may be pressed.

In the case of pipe couplings, depending on the type of coupling, clamping rings or cutting rings are frequently not fitted on the pipe during the final pipe assembly, but they are pre-assembled in advance. The special purpose of this measure is to ensure a functionally accurate connection between the pipe and the clamping or cutting ring. The rings are pre-fitted by using a pre-assembly muff. The pre-assembly muffs used are suitable for being operated by hand or by an assembly machine.

However, such pre-assembly muffs have a problem in that the surface of the inner cone is subject to wear with the resulting disadvantage of causing the dimensions of the inner cone to change. If the diameter of the conical face increases, the axial travel of the clamping or cutting ring appears to be greater than actually required in order to achieve the connection. But for the fitter it is not always immediately obvious that the permissible service life has already been exceeded. To be able to operate with safe conditions he would have to arrange for the inner conical face of the pre-assembly muff to be measured. This is a complicated and expensive process. Furthermore, an inaccurate or improper assembly leads to leakages and unfastening of the connection.

It is therefore the object of the present invention to provide a pre-assembly muff which makes it possible for the user to identify the end of the service life of the muff without there being any need for additional checks in the form of measurements.

SUMMARY OF THE INVENTION

The invention provides a pre-assembly muff for fitting a cutting or clamping ring of a pipe coupling on a pipe, which comprises an inner cone which is designed to support the ring slid on to the pipe and into which the ring may be pressed, wherein the surface of the inner cone has been provided with a wear resistant coating whose color differs from that of the base material.

There are available a number of surface coating processes which cause the surface treated in accordance with such processes to be colored. As compared to conventional pre-assembly muffs, the end of the service life is clearly indicated. If the wear resistant coating has been removed to the extent where the base material is visible, the end of the service life has been reached. This is an easy way of indicating to the user that if the muff continues to be used, accurate functioning of the pre-assembled rings is adversely affected and the assembled pipe coupling is also adversely affected. There is no need for subsequent measurements. It is quite easy for the user to see that he has to use a new pre-assembly muff if he wants to avoid any disadvantages.

The wear resistant coating preferably has a higher strength than the base material, the advantage of this feature of the invention being that at the same time the wear strength of the pre-assembly muff is increased.

It is also possible to provide several layers of wear resistant coatings, especially in different colors, so that wear stages can be identified. But in any case, the first coating applied to the base material should differ in color substantially.

A preferred wear resistant coating whose color differs from that of the base material is a titanium nitrite coating. As an alternative it is possible to use aluminium-silicate or a hard chromium coating. The above-mentioned coatings and coating processes are known in themselves.

BRIEF DESCRIPTION OF THE DRAWINGS

The invention will be explained with the help of the drawing which in diagrammatic form illustrates a typical pipe coupling and two alternative embodiments of a pre-assembly muff.

In the drawings.

DESCRIPTION OF PREFERRED EMBODIMENTS

Figure 1:
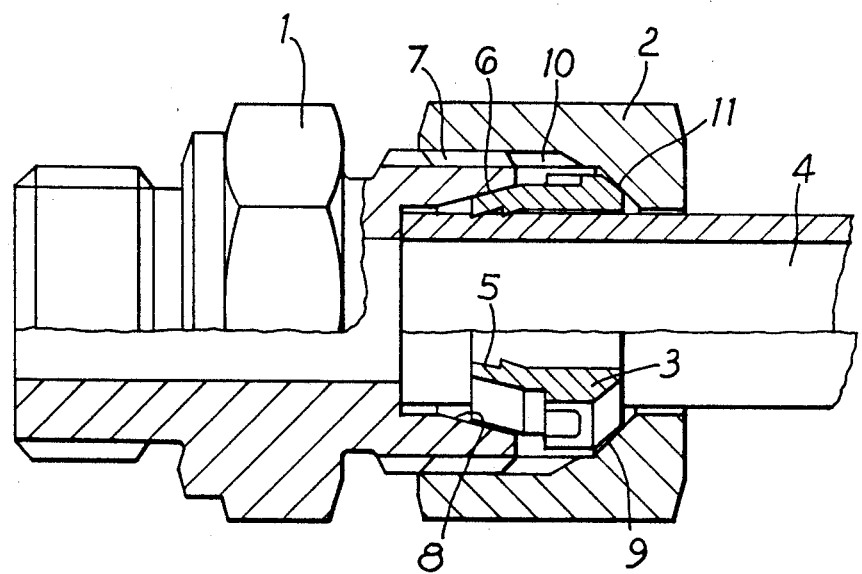
FIG. 1 is a side elevational view, partly in section, of a coupling including a cutting ring.
Figures 2, 3:
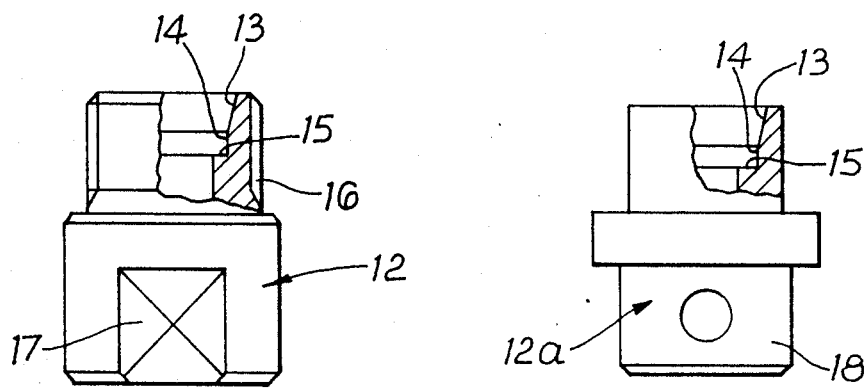
FIG. 2 is a side elevational view, partly in section, of a pre-assembly muff for manual assembly.
FIG. 3 is a view similar to FIG. 2 but of a pre-assembly muff to be inserted by an assembly machine.

The pipe coupling shown in FIG. 1 shows a coupling member 1, a nut 2, a cutting ring 3 inserted between the nut 2 and the member 1 and a pipe 4 introduced into the coupling member 1 through the nut 2 and the cutting ring 3. Starting from its end facing the nut 2, the member 1 comprises a bore 8 decreasing conically and extending into its interior. This conical bore 8 is followed by a cylindrical bore with a bore step against which the pipe 4 is supported. The member 1 has been provided with an external thread 7 on to which the nut 2 is threaded with its inner thread 10. The nut 2 comprises a bore 9 decreasing conically away from the member 1. The cutting ring 3 received between the member 1 and the nut 2 and slid across the pipe 4 comprises a conical face 6 which faces the member 1 and by means of which it is supported in the conical bore 8 of the member 1. In the region of the conical face 6 in the bore of the cutting ring 3 there have been provided one or several axially adjoining blades 5 which cut into the surface of the pipe 4. The cutting ring 3 comprises a further conical face 11 which faces the nut 2 and which comes to rest against the conical bore 9 of the nut 2. FIG. 1 shows the pipe coupling in the assembled condition. In order to ensure that the cutting ring is securely attached to the pipe 4 and in consequence, to achieve a leakproof connection, pre-assembly muffs 12, 12a as illustrated in FIGS. 2 and 3 for example are used. The pre-assembly muff 12 as shown in FIG. 2 essentially corresponds to the coupling member 1. It also comprises a bore 13 which decreases conically from its one end and which is referred to as the inner conical face. The inner conical face 13 is followed by a cylindrical bore step 14 provided with a radially inwardly extending stop 15. As far as the design of the inner conical face 13, the bore 14 and the stop 15 are concerned, the two embodiments of the pre-assembly muff 12, 12a as shown in FIGS. 2 and 3 are identical.

The pre-assembly muff 12 illustrated in FIG. 2 is designed for being fitted by hand. For this purpose it has been provided with a thread 16 which corresponds to the outer thread 7 of the member 1 of the coupling and on to which the nut 2 is screwed. It also comprises a projection provided with flattened portions 17 which, for example, may serve to clamp the pre-assembly muff 12 into a vice. For assembly purposes, first a nut 2 and then a cutting ring 3 or clamping ring are slid on to the pipe 4. The pipe 4, together with the cutting ring 3, is then introduced into the pre-assembly muff 12 so that the cutting ring 3 is supported on the inner conical face 13. The end face of the pipe 4 rests against the stop 15 of the cylindrical bore 14. Subsequently, the nut is tightened by a spanner by the number of revolutions given for the respective type of coupling in the assembly instructions. As compared to the coupling members 1 of a standard coupling, the pre-assembly muffs 12 are made of a higher-strength material because they assist the cutting operation of the blades 5. The relative movement between the cutting ring 3 or clamping ring and its outer face 6 and the inner cone 13 of the pre-assembly muff, under high pressure, causes material removal or wear. The surface of the inner conical face 13 has been provided with a wear resistant coating, for instance of titanium nitrite colored yellow. The coating is applied by processes known in themselves. The color of the wear resistant coating differs from that of the base material. If, due to frequent use of the pre-assembly muff 12, the wear resistant coating applied to the inner conical face 13 has been removed or is worn, the color of the base material emerges. As its color differs from that of the coating, the user can quite easily see that the wear resistant coating normally indicating that the necessary dimensions of the inner cone ensuring accurate and functionally safe assembly still prevail, has been removed, with the base material shining through indicating the end of the service life.

The embodiment of the assembly muff 12a of FIG. 3 differs from that to FIG. 2 only in that the diameter in the region of the inner cone 13 has been reduced so that the nut can freely be moved across this region by the pressure punch of the assembly machine. Furthermore, the pre-assembly muff 12a of FIG. 3 comprises a supporting collar for providing support in the tool holder of the assembly machine, as well as a projection 18 with which it is received in a corresponding bore of the assembly machine. As far as functioning and design of the inner conical face 13 of the pre-assembly muff are concerned, there are no differences relative to the embodiment of FIG. 2.

We claim:

1. A pre-assembly muff for fitting a cutting or clamping ring of a pipe coupling on a pipe, which comprises an inner cone which is designed to support the ring slid onto the pipe and into which the ring may be pressed, wherein the inner cone has been provided with several layers of wear-resistant coatings and wherein the several layers of wear-resistant coatings are colored so that consecutive layers are recognizable from one another.

2. A muff for repeated use in preassembling cutting or clamping rings of a pipe coupling onto pipes, the muff comprising an inner cone which is designed to support the ring slid onto the pipe and into which the ring may be pressed, and wherein the surface of the inner cone which is continually engaged by the repeated pressing of the rings into it is provided with an adherent wear-resistant coating whose color differs from that of the base material of the muff, the coating being of such thickness and material that it is gradually worn away by repeated engagement by said rings during use of the muff so that exposure of an area of said base material in the inner cone is a signal that the service life of the muff has ended.

* * * * *